United States Patent
Jordan, Jr. et al.

[19]

[11] Patent Number: 5,910,099
[45] Date of Patent: Jun. 8, 1999

[54] TURBOCHARGED ENGINE COOLING SYSTEM CONTROL WITH FUEL ECONOMY OPTIMIZATION

[75] Inventors: Lawrence Benard Jordan, Jr., Bolingbrook; Teoman Uzkan, Indian Head Park, both of Ill.

[73] Assignee: General Motors Corporation, Detroit, Mich.

[21] Appl. No.: 08/948,508

[22] Filed: Oct. 10, 1997

Related U.S. Application Data

[63] Continuation of application No. 08/807,558, Feb. 28, 1997, abandoned.

[51] Int. Cl.⁶ ................................................ F02B 29/04
[52] U.S. Cl. ...................... 60/599; 123/41.29; 123/41.31
[58] Field of Search ........................ 60/599; 123/41.29, 123/41.31, 563

[56] References Cited

U.S. PATENT DOCUMENTS

| | | | |
|---|---|---|---|
| 3,397,684 | 8/1968 | Scherenberg . | |
| 4,061,187 | 12/1977 | Rajasekaren et al. . | |
| 4,325,219 | 4/1982 | Stang et al. | 60/599 |
| 4,485,624 | 12/1984 | Melchior | 60/599 |
| 4,517,929 | 5/1985 | Musick et al. | 123/41.1 |
| 4,520,767 | 6/1985 | Roettgen et al. | 123/41.1 |
| 4,550,692 | 11/1985 | Crofts, Sr. | 123/41.1 |
| 4,620,509 | 11/1986 | Crofts | 123/41.1 |
| 4,697,551 | 10/1987 | Larsen et al. | 123/452 |
| 4,961,404 | 10/1990 | Itakura et al. | 123/41.31 |
| 5,201,285 | 4/1993 | McTaggart | 123/41.31 |
| 5,353,757 | 10/1994 | Susa et al. | 123/41.29 |
| 5,415,147 | 5/1995 | Nagle et al. | 60/599 |
| 5,542,399 | 8/1996 | Altmann et al. | 60/599 |
| 5,598,705 | 2/1997 | Uzkan | 60/599 |

FOREIGN PATENT DOCUMENTS

| | | |
|---|---|---|
| B-27170 | 5/1993 | Australia . |
| 950020 | 2/1964 | United Kingdom . |

*Primary Examiner*—Michael Koczo
*Attorney, Agent, or Firm*—Robert M. Sigler

[57] ABSTRACT

A turbocharged engine cooling system has separate, complete engine and aftercooler coolant loops connected by a linking conduit with a link valve and a fan apparatus providing air flow through both engine and aftercooler radiators. The fan apparatus is controllable to vary the air flow in a series of discrete cooling levels. An engine cooling control is responsive to a coolant temperature in the engine coolant loop to control the fan apparatus and to derive and output a signal indicative of a desired level of cooling between the selected one and an adjacent one of the discrete cooling levels. An aftercooler cooling control is responsive to a coolant temperature in the aftercooler coolant loop and the signal output by the engine cooling control to control the link valve so as to vary the temperature of coolant in the engine cooling loop, by controlled mixing of coolant of lower temperature from the aftercooler cooling loop, so as to achieve the desired level of cooling indicated by the signal.

6 Claims, 7 Drawing Sheets

TURBOCHARGED ENGINE COOLING SYSTEM CONTROL WITH FUEL ECONOMY OPTIMIZATION

This is a continuation of application Ser. No. 08/807,558 filed on Feb. 28, 1997, abandoned.

TECHNICAL FIELD

The technical field of this invention is the cooling of turbocharged internal combustion engines.

BACKGROUND OF THE INVENTION

Cooling systems for turbocharged diesel engines of locomotives are known which provide for cooling of the engine and of a turbocharger aftercooler. One such system is described in U.S. Ser. No. 08/437,391, filed May 12, 1995 by Teoman Uzkan, one of the inventors of this invention, and issued as U.S. Pat. No. 5,598,705 on Feb. 4, 1997. This system provides separate engine and aftercooler coolant loops, each with its own radiator, coolant conduit and pump; but the system also provides a linking conduit with a link valve. When the valve is closed, coolant flows in the engine and aftercooler coolant loops are maintained separate, with no coolant mixing; but the valve is capable of opening to permit a controlled mixing of coolant between the loops. With the valve closed, the temperature in the aftercooler coolant loop is ordinarily lower than that in the engine coolant loop for maximum fuel economy due to the cooling of turbocharged induction air, but a control is capable of opening the link valve to provide additional cooling capacity in the engine coolant loop by mixing in the lower temperature coolant from the aftercooler coolant loop. Thus, economy can be achieved in the design of the engine coolant loop, with expansion of cooling capacity by the opening of the link valve in extreme temperature conditions when maximum engine cooling is required; but fuel economy can be maximized during normal temperature conditions by closing the link valve when maximum engine cooling is not required.

SUMMARY OF THE INVENTION

This invention is an improved control for an engine cooling system of the type shown in the aforementioned U.S. patent, which is also provided with a fan apparatus for drawing air through the radiators of the engine and aftercooler coolant loops in a plurality of selectable, discrete cooling levels. In this invention, additional fuel economy is achieved by control of the link valve during normal temperature conditions to supplement the fan apparatus by providing a level of cooling for the engine coolant loop between that produced by the selectable, discrete cooling levels produced by the fan apparatus.

The cooling system control of this invention comprises an engine cooling control responsive to a coolant temperature in the engine coolant loop to operate the fan apparatus at a selected one of the plurality of selectable, discrete cooling levels in response to the temperature of coolant in the engine coolant loop and to derive and output a signal indicative of a desired level of cooling between the selected one and an adjacent one of the plurality of selectable, discrete cooling levels. It further comprises an aftercooler cooling control responsive to a coolant temperature in the aftercooler coolant loop and the signal output by the engine cooling control to control the link valve so as to vary the temperature of coolant in the engine cooling loop, by controlled mixing of coolant of lower temperature from the aftercooler cooling loop, so as to achieve the desired level of cooling indicated by the signal.

DESCRIPTION OF THE PREFERRED EMBODIMENT

Figure 1:
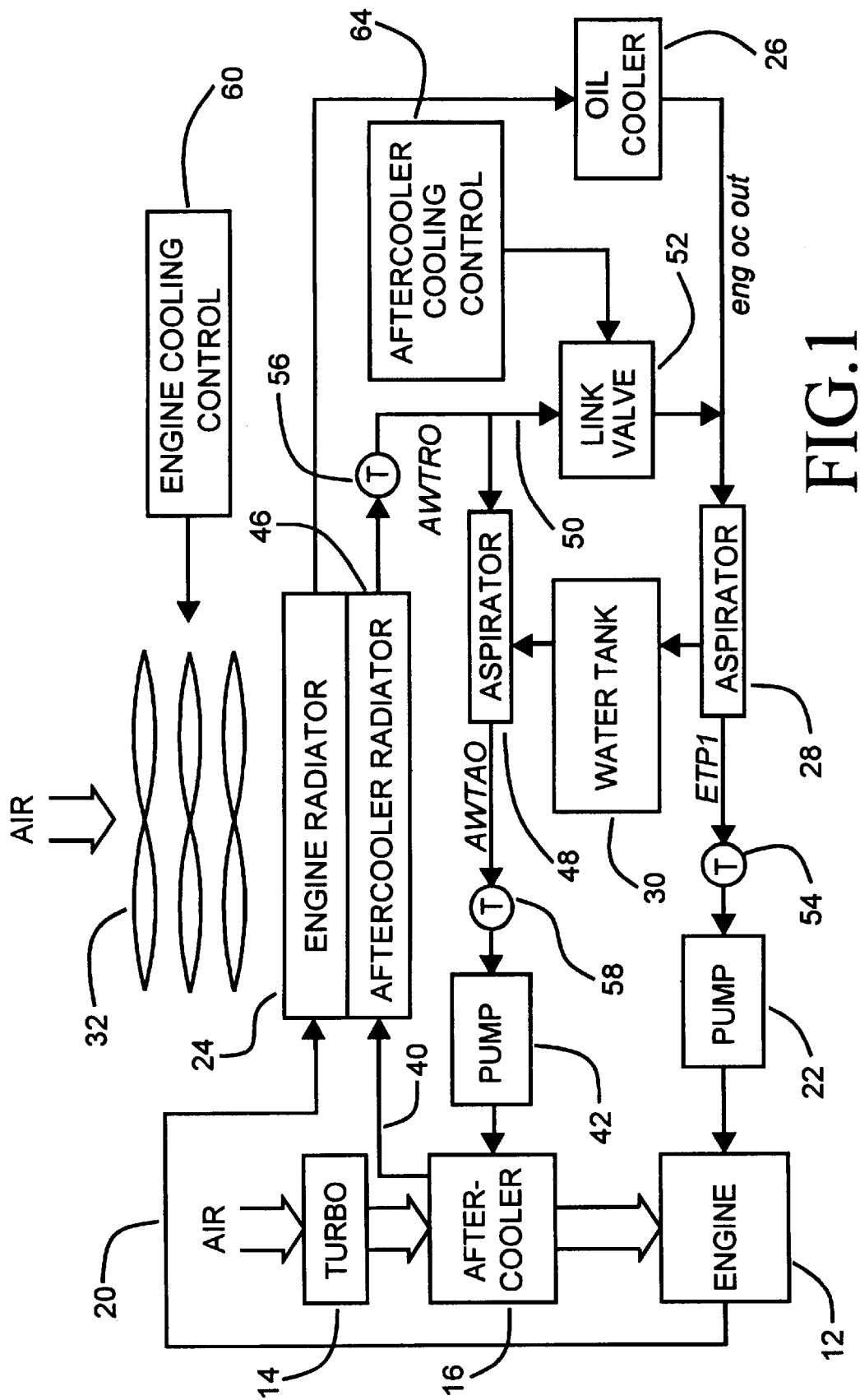
FIG. 1 shows a block diagram of a turbocharged diesel engine having a cooling system control according to the invention.

FIG. 1 shows a cooling system for an internal combustion engine 12, such as a diesel engine for a diesel-electric locomotive. Engine 12 is provided with a turbocharger 14, which provides pressurized induction air to the combustion chambers of engine 12. Since this pressurization tends also to heat the air, an aftercooler 16 is placed between turbocharger 14 and engine 12 to cool the induction air and thus increase the fuel economy of engine 12.

The cooling system of FIG. 1 has two separate coolant loops: an engine coolant loop for engine 12 and an aftercooler coolant loop for aftercooler 16. The engine coolant loop comprises an engine coolant conduit 20, an engine coolant pump 22, the coolant passages of engine 12, an engine radiator 24 and an optional oil cooler 26. In the engine coolant loop, coolant is circulated unidirectionally around the loop by pump 22 so that it receives heat from engine 12 and optional oil cooler 26 and gives up heat to the ambient air of the environment in engine radiator 24. Coolant tank 30 communicates with engine coolant conduit 20 through an aspirator 28 near the inlet of pump 22 to give and receive coolant as required to maintain coolant in the loop.

The aftercooler coolant loop comprises an aftercooler coolant conduit 40, an aftercooler coolant pump 42, an aftercooler 16, and an aftercooler radiator 46. In the aftercooler coolant loop, coolant is circulated unidirectionally around the loop by pump 42 so that it picks up heat from aftercooler 16 and gives up heat to the ambient air of the environment in aftercooler radiator 46. Coolant tank 30 connects with aftercooler coolant conduit 40 through an aspirator 48 near the inlet of aftercooler pump 42 to give and receive coolant therefrom as required to maintain coolant in the loop.

In the preferred embodiment of a diesel-electric locomotive, water is used as the coolant for both the engine and aftercooler coolant loops. Therefore, in this description of a preferred embodiment, the terms "water" and "coolant" may be used interchangeably. However, the invention is applicable to other liquid coolants and is not restricted to water.

Fan apparatus 32 forces ambient air through engine radiator 24 and aftercooler radiator 46. Fan apparatus 32 provides air flow in a plurality of discrete cooling levels which are selectable by an engine cooling control to provide different cooling rates for the engine coolant in engine radiator 24. Fan apparatus 32 may advantageously comprise one or more fans, each having an off condition, a low power condition and a high power condition. The fans are preferably electrically powered, the electric power for their operation being derived from a generator included in the apparatus and driven by engine 12. With the activation of a fan or an increase from a low to a high power condition, fan apparatus 32 increases to a new level the airflow through radiators 24 and 46 and therefore the cooling of engine 12.

Linking conduit 50 connects aftercooler coolant conduit 40, at a point downstream from aftercooler radiator 46 but prior to aspirator 48, with engine coolant conduit 20, at a point downstream from engine radiator 24 (and oil cooler 26 if present) but before aspirator 28. Linking conduit 50 is provided with a link valve 52 which has a closed condition in which no coolant flows through linking conduit 50 and the engine coolant loop and aftercooler coolant loop thus each circulate their own coolant with no mixing. Link valve 52 can alternatively be opened to allow controlled coolant flow through linking conduit 50 from aftercooler coolant conduit 40 to engine coolant conduit 20, with coolant tank 30 serving as a return flow conduit. The greater the opening of link valve 52, the greater is the amount of aftercooler coolant mixed with the engine coolant.

The components of the engine and aftercooler coolant loops are sized and designed so that, with separate operation and no mixing of coolant between the loops, the engine cooling loop provides cooling capacity sufficient for normal operation but not for the most extreme requirements. This can be accomplished, for example, through the sizing, design and arrangement of system components such as conduits, pumps, radiators, etc. Cost is thus reduced in the manufacture of the locomotive of which engine 12 is part. In addition, the aftercooler coolant loop maintains a lower coolant temperature than the engine coolant loop for optimal fuel economy, due to cooler induction air, when its cooling capacity is not required to supplement that of the engine coolant loop.

Three sensors provide temperature signals in the cooling system. Temperature sensor 54 is located in engine cooling conduit 20 between aspirator 28 and the inlet of engine coolant pump 22 and provides a signal ETP1 of engine coolant temperature. Temperature sensor 56 is located in aftercooler conduit 40 between the outlet of aftercooler radiator 46 and aspirator 48 and provides a signal AWTRO of aftercooler coolant temperature prior to mixing. Temperature sensor 58 is located in aftercooler conduit 40 between aspirator 48 and the inlet to engine coolant pump 42 and provides a signal AWTAO of aftercooler coolant temperature after mixing.

Figure 2:
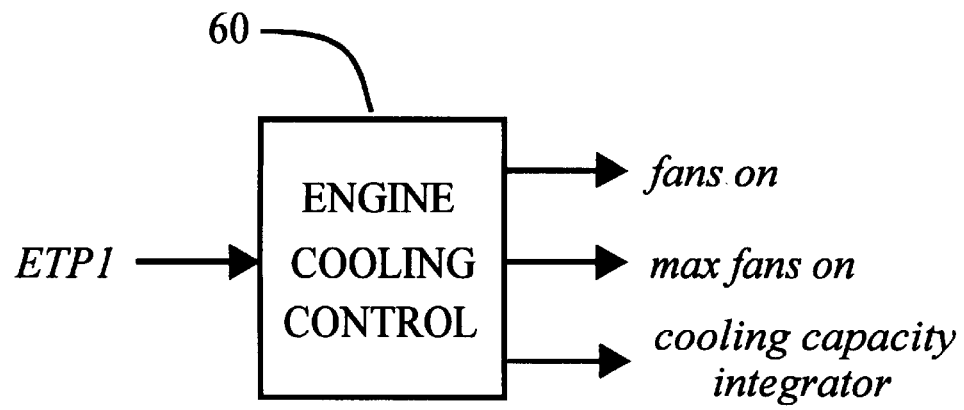
FIG. 2 shows a block diagram of an engine cooling control for use in the cooling system control of the engine of FIG. 1.

The cooling system of FIG. 1 is provided with an engine cooling control 60 and an aftercooler cooling control 64. Engine cooling control 60 is shown in FIG. 2 with its relevant input and outputs. It is responsive to engine coolant temperature signal ETP1 from sensor 54 and provides an output signal fans on, which specifies the cooling level of fan apparatus 32 and is provided thereto as a control input and also to aftercooler cooling control 64, and signals cooling capacity integrator and max fans on, which are provided to aftercooler cooling control 64. Signal max fans on indicates when fan apparatus is operating at its maximum cooling level; and cooling capacity integrator is an intermediate integrator quantity generated in engine cooling control 60 to indicate a desired cooling level value between the discrete steps of signal fans on for use in the determination of the latter and provided as a signal thereof to aftercooler cooling control 64.

Figure 3:
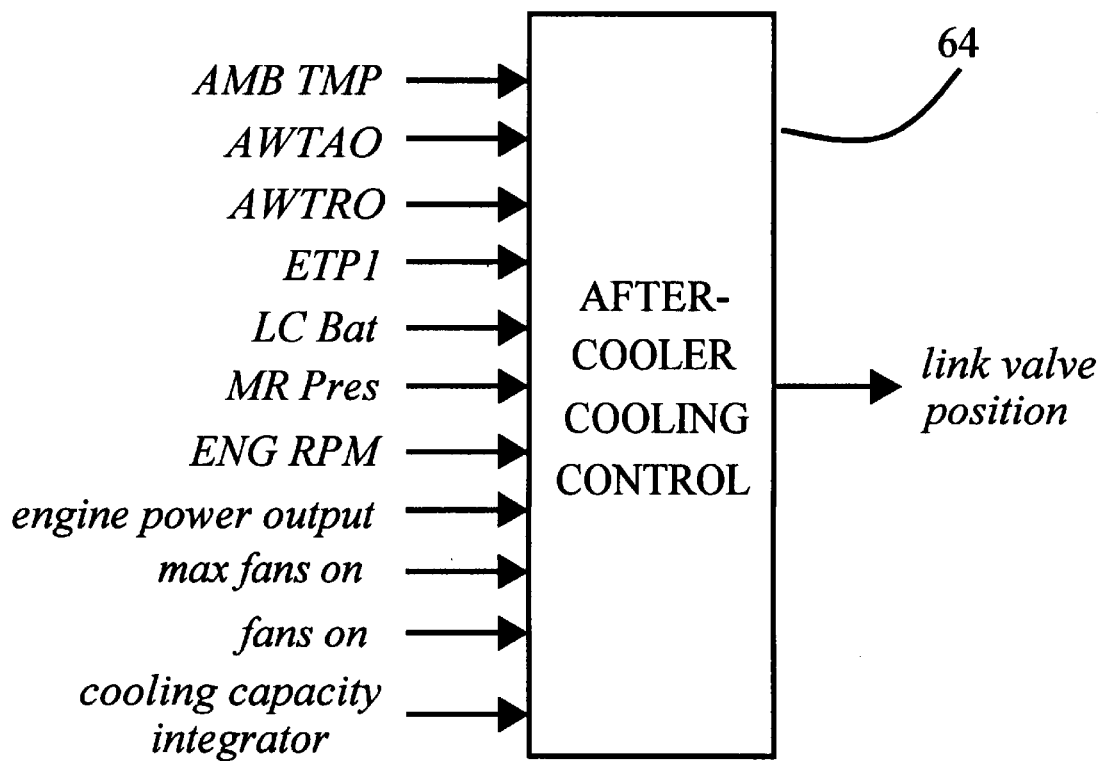
FIG. 3 shows a block diagram of an aftercooler cooling control for use in the cooling system control of the engine of FIG. 1.

Aftercooler cooling control 64 is shown in FIG. 3 with its relevant inputs and outputs. In addition to signals fans on, max fans on and cooling capacity integrator from engine cooling control 60, aftercooler cooling control 64 is responsive to temperature signals ETP1 from sensor 54, AWTRO from sensor 56 and AWTAO from sensor 58, an ambient temperature signal AMB IMP from an ambient temperature sensor not shown, an engine speed signal ENG RPM from an engine speed sensor not shown and an engine power signal engine power output. Aftercooler cooling control 64 further receives a pair of enabling signals from appropriate sensing apparatus: LC Bat, which is indicative of the operational state of power for the valve actuator signal, and MR Pres, which indicates that the electro-pneumatic valve actuator has sufficient air pressure to operate. Aftercooler cooling control 64 provides an output link valve position, which controls link valve 52.

In a model of the cooling system of FIG. 1, each of the engine coolant and aftercooler coolant loops may circulate coolant separately or, if the link valve is open, with coolant mixing to a degree dependent on the link valve position. ACC LINK RATIO is a constant indicating the percentage of aftercooler flow that transfers to the engine coolant loop with the link valve completely open. This ratio is typically about 33 percent. Constant ACC CAPACITY RATIO is the percentage of coolant flow in the aftercooler coolant loop relative to that in the engine coolant loop, which is equal to the mass flow ratio $dm_1/dm_2$ and is typically about 25 percent. The mixing process can be considered a two input/two output closed system, with inputs in aftercooler coolant conduit 40 and engine coolant conduit 20 just before linking conduit 50 and with outputs in each of conduits 40 and 20 just before pumps 42 and 22, respectively. Since coolant tank 30 equalizes the relative pressure at the two outputs, the mass flows through each of conduits 40 and 20 are constant. The link ratio is the amount of linking flow requested relative to the maximum possible linking flow. This ratio will have a value between 0 (link valve closed) and 1.0 (link valve full open). Thus:

$$dm_1/dt = (dm_2/dt) \text{ (ACC CAPACITY RATIO)};$$

$$dm_{link}/dt = (\text{link ratio}) \text{ (ACC LINK RATIO)} (dm_1/dt);$$

$$dm_{link}/dt = (\text{link ratio}) \text{ (ACC LINK RATIO)} \text{ (ACC CAPACITY RATIO)} (dm_2/dt).$$

The mass flow in engine coolant conduit 20 between linking conduit 50 and aspirator 28 is $dm_x/dt = dm_{link}/dt + dm_2/dt$. Thus:

$$dm_x/dt = (\text{link ratio}) \text{ (ACC LINK RATIO)} \text{ (ACC CAPACITY RATIO)} (dm_2/dt) + dm_2/dt;$$

$$dm_x/dt = (dm_2/dt)[(\text{link ratio}) \text{ (ACC LINK RATIO)} \text{ (ACC CAPACITY RATIO)} + 1].$$

An energy balance equation at this point yields:

$$(dm_x/dt)(ETP1)(Cp_{water}) = (dm_{link}/dt)(AWTRO)(Cp_{water}) + (dm_2/dt)(\text{eng oc out})(Cp_{water}),$$

wherein the coolant is water, $Cp_{water}$ is its heat capacity, and eng oc out is the temperature at the outlet of oil cooler 26, prior to linking conduit 50. From the previous equation, the following can be derived:

$$(dm_x/dt)(ETP1) = (dm_{link}/dt)(AWTRO) + (dm_2/dt)(\text{eng oc out});$$

$(dm_x/dt)(ETP1)=(dm_2/dt)$ (ACC CAPACITY RATIO) (ACC LINK RATIO) $(AWTRO)+(dm_2/dt)$ (eng oc out);

$ETP1=[$(link ratio) (ACC CAPACITY RATIO) (ACC LINK RATIO) $(AWTRO)+$eng oc out$]/[$(link ratio) (ACC CAPACITY RATIO) (ACC LINK RATIO) $(AWTRO)+1]$.

Likewise, equations can be derived for temperatures eng oc out and AWTAO. If any of the three temperature sensors 54, 56 or 58 fails, the unknown temperature can be estimated from the others if link valve 52 is fully open.

Figure 4:
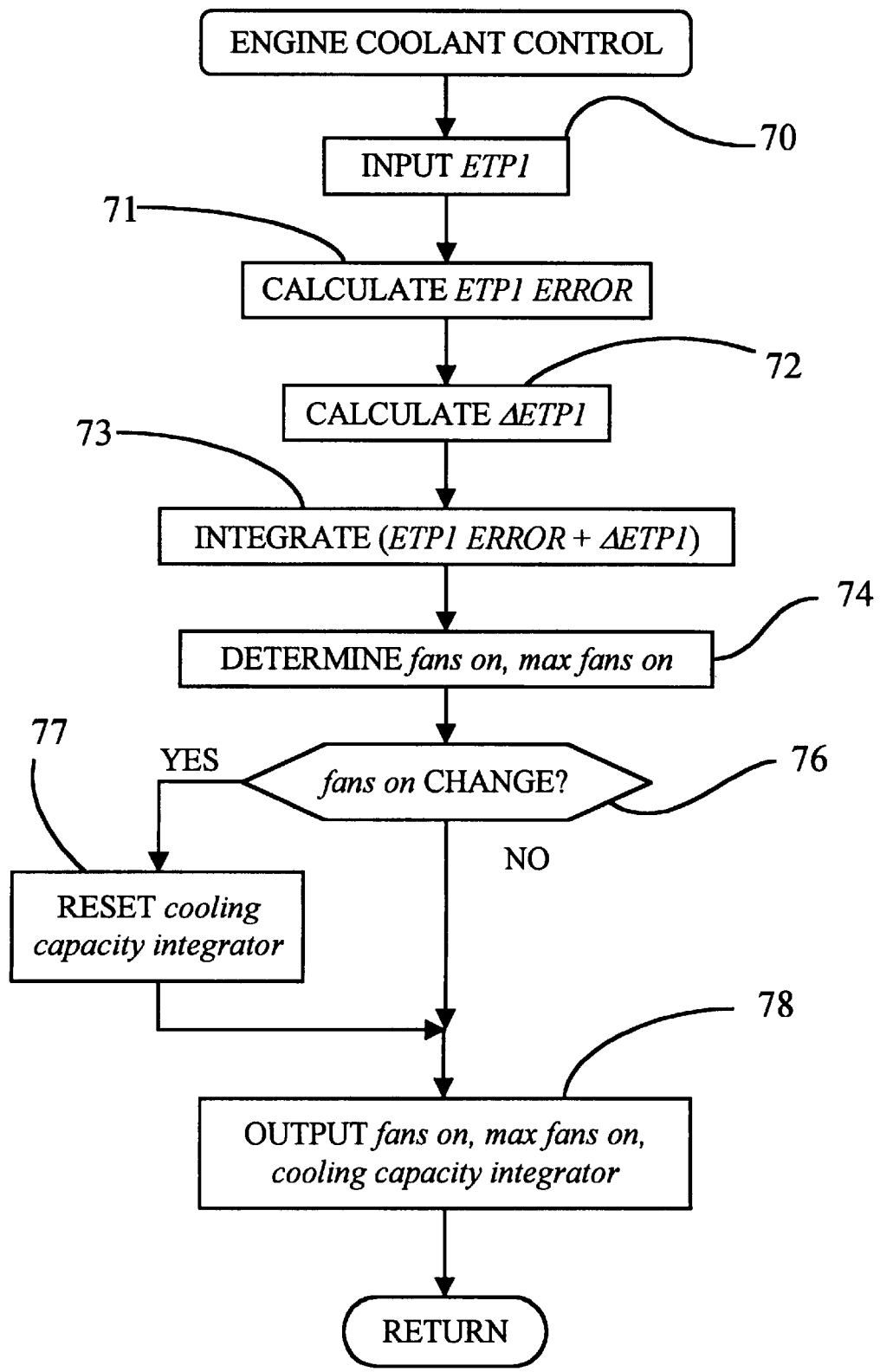
FIG. 4 shows a flow chart illustrating the operation of the engine cooling control of FIG. 2.

Engine cooling control 60 may comprise a programmed digital computer, a flow chart for which is shown in FIG. 4. The routine ENGINE COOLING CONTROL derives from engine coolant temperature ETP1 a fans on output signal for control of fan apparatus 32. The routine is run once every 10 seconds and would therefore preferably be run as a subroutine from a main routine having a software timing loop or from a timed interrupt. Referring to FIG. 4, a new value of ETP1 is input and saved at step 70. At step 71, the difference ETP1 ERROR between this value and a desired value is computed. The desired value is a predetermined temperature at which the engine is designed to operate—for example, 180° C. At step 72, a rate of change value ΔETP1 is calculated from the difference between the present value and the previously saved value of ETP1. At step 73 the sum (ETP1 ERROR+ΔETP1) is integrated with a standard discrete integration algorithm, the new integrated value being the value of cooling capacity integrator.

At step 74, the routine determines the desired value of fans on from the value of cooling capacity integrator. As previously stated, fan apparatus 32 may comprise one or more fans, each of which is capable of being operated in one or more speed modes. Each fan activated will increase air flow through radiators 24 and 46. In addition, each higher speed mode increases fan speed and thus also increases air flow through the radiators. In a preferred embodiment, there are three fans, each of which has a low speed mode and a high speed mode. The fans are activated and/or switched between low and high speed modes in a series of fan steps, with each fan step providing a new, discrete cooling level for engine 12. Each fan uses much more power, relative to the resulting cooling effect, in its high speed mode than it uses in its low speed mode. Therefore, as greater cooling is required, the fans are most efficiently turned on in this order: (1) one fan low, (2) two fans low, (3) three fans low, (4) one fan high, two fans low, (5) two fans high, one fan low, and (6) three fans high. These conditions are called fan steps, the numbers of these steps in order are the values of fans on. When less cooling is required, the fans are reduced and turned off in the reverse order.

The integral of (ETP1 ERROR+ΔETP1) calculated in program step 73 is essentially continuous as compared with the large steps in power or cooling between fan steps. Therefore, the value of cooling capacity integrator is scaled so that the next higher or lower fan step is indicated by a cooling capacity integrator value of +1.0 or −1.0, respectively. The value of cooling capacity integrator thus indicates the relative closeness of the next desired fan step, either higher or lower, and thus indicates a desired cooling level for engine cooling between adjacent discrete fan steps (fan produced cooling levels). When the value of cooling capacity integrator reaches +1.0, the value of fans on is increased by one; and when the value of cooling capacity integrator reaches −1.0, the value of fans on is decreased by one. The signal max fans on is a binary flag which may be set to 1 when the control chooses the highest fan step, with all fans on high (fans on=6) and reset to 0 for any other fan step. Signal max fans on is also determined in program step 74.

In program step 76, it is determined if the value of fans on has changed. If it has, the value of cooling capacity integrator is reset to zero in step 77 so as to begin a new integral at zero with respect to the new fan step. At program step 78, whether or not the value of fans on has changed, the value of fans on is output to fan apparatus 32; and the values of fans on, mar fans on and cooling capacity integrator are output to aftercooler cooling control 64. From program step 78, the routine returns.

Routine AFTERCOOLER COOLING CONTROL is described with reference to the flow chart of FIGS. 5A–5C. This routine is also preferably run every 10 seconds, just after the ENGINE COOLING CONTROL routine described above. Routine AFTERCOOLER COOLING CONTROL responds to a plurality of previously described inputs to control link valve 52 in the performance of several basic tasks. One of these basic tasks is the limitation of temperature difference between coolants in the engine and aftercooler radiators so as to prevent radiator damage due to thermal stresses. The opening of link valve 52 causes mixing of coolants between the engine and aftercooler coolant loops and thus decreases the coolant temperature difference between the loops. Another of these basic tasks is the prevention of aftercooler coolant freezing. The opening of link valve 52 allows hotter coolant from the engine coolant loop to enter the aftercooler coolant loop to raise the aftercooler coolant temperature. A third basic task is the provision of extra cooling capacity for the engine in extremely hot operating conditions. The opening of link valve 52 allows cooler coolant from the aftercooler loop to enter the engine coolant loop and thus provide extra cooling capacity for the engine. A fourth basic task, and the subject of this invention, is the optimization of engine efficiency, in the form of improved fuel economy, by operating link valve 52 in normal temperature conditions to supplement engine cooling between discrete fan steps when such a supplement would be more efficient than changing fan steps.

Aftercooler cooling control 64 could control either the temperature (AWTRO) at the outlet of aftercooler radiator 46 or the temperature (AWTAO) at the core inlet of aftercooler 16. Although the control requirements are mostly in terms of AWTRO, AWTAO was chosen for the following reason. Since the coolant for the engine coolant loop is mixed immediately before temperature sensor 58 (AWTAO), the effects of changes in the state of link valve 52 are sensed immediately. If AWTRO were used, these effects would not be sensed until the resulting mixed coolant had circulate through the aftercooler coolant loop to temperature sensor 56. In addition, the linearization of the control is more straightforward.

Figure 5A:
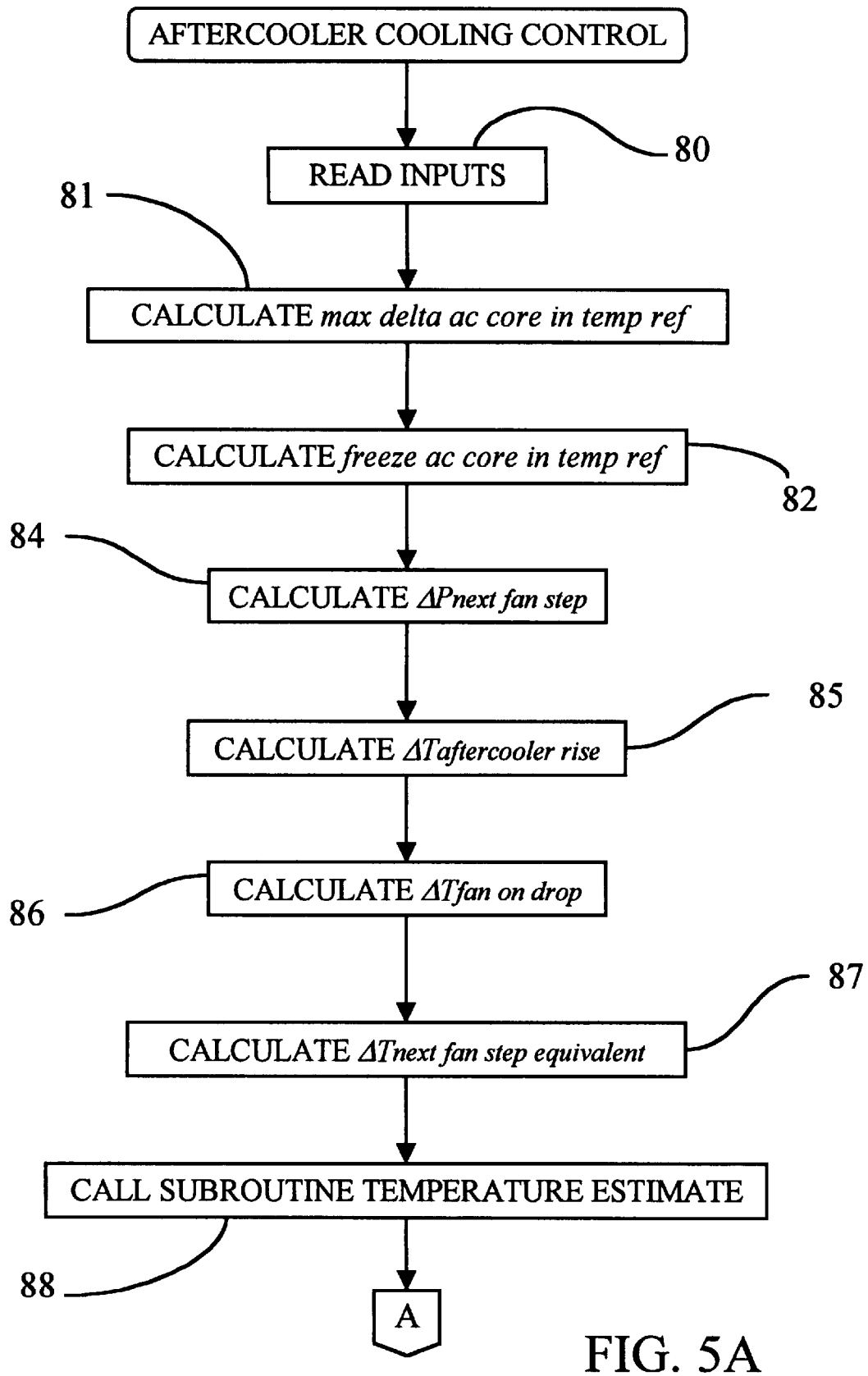
FIGS. 5A, 5B, 5C and 6 show flow charts illustrating the operation of the aftercooler cooling control of FIG. 3.

Referring to FIG. 5A, routine AFTERCOOLER COOLING CONTROL first reads the inputs in step 80. As previously described, these inputs include several temperature signals (ETP1, AWTAO, AWTRO and AMB TMP), an engine speed signal (ENG RPM), an engine power signal (engine power output), several signals indicating the readiness of the link valve to respond to an activation signal (LC Bat, MR Pres) and three signals from engine cooling control 60 indicating fan status (fans on, max fans on, and cooling capacity integrator).

In step 81, the routine calculates a reference temperature value max delta ac core in tempref, which is the lowest value of AWTAO allowed for the present value of ETP1 and thus limits the temperature difference between the engine and aftercooler coolant loops. This calculation involves first deriving the temperature eng oc out at the outlet of oil cooler 26 from temperature ETP1:

eng oc out=$ETP1$ [1+(link ratio) (ACC CAPACITY RATIO) (ACC LINK RATIO)]−[(AWTRO) (link ratio) (ACC CAPACITY RATIO) (ACC LINK RATIO)].

The radiator outlet coolant temperature at the radiator outlet is eng oc out less the temperature rise across the oil cooler, the latter being approximated by a constant:

eng rad out temp=eng oc out−NOMINAL OIL COOLER RISE.

Since the difference in the radiator outlet temperatures must be limited, a minimum aftercooler radiator outlet temperature is established, based on a predetermined maximum allowed temperature difference MAX RAD OUT DELTA TEMP:

min ac rad out temp=eng oc out−MAX RAD OUT DELTA TEMP.

The min ac rad out temp must be converted to be in terms of an aftercooler core inlet coolant (water) temperature. Since AWTAO and AWTRO are measured, the offset between the two values is known at any given time; and this difference is used for the conversion:

max delta ac core in temp ref=min ac core in temp ref+(AWTAO−AWTRO).

The value of max delta ac core in temp ref is saved.

In step 82, a reference temperature value freeze ac core in temp ref is established in order to prevent the coolant (water) in the aftercooler circuit from freezing. Since the outlet of the radiator normally has the coldest coolant, it is preferably used as the basis for control. A more conservative limit may be used when the ambient conditions indicate that there is an increased possibility of freezing within the system. Hysteresis may be used to prevent the temperature reference from rapidly changing between the two limits. If the ambient temperature is less than zero degrees C. or the ambient temperature signal has failed, an aftercooler freeze condition is TRUE and the following calculation is performed:

freeze ac rad out temp ref=COLD MIN AC RAD OUT TEMP.

However, if the ambient temperature is valid and greater than 5 degrees C., aftercooler freeze condition is FALSE, and an alternative calculation is performed:

freeze ac rad out temp ref=MIN AC RAD OUT TEMP.

MIN AC RAD OUT TEMP and COLD MIN AC RAD OUT TEMP are predetermined constants. In either case, freeze ac core in temp ref=freeze ac rad out temp ref +(AWTAO−AWTRO).

The value of freeze ac core in temp ref is saved.

An object of this invention is to manage engine cooling in the most fuel efficient manner consistent with the temperature limits of the engine and cooling system. The fans of fan apparatus 32 are typically powered by a synchronous or similar AC motor from an AC generator driven by the engine. The result is that the fan speed is essentially proportional to engine speed, with the constant of proportionality being higher in the high speed mode than in the low speed mode. This higher constant of proportionality, however, does not produce a cooling capacity increase commensurate with the associated increase in power used. Thus, the fan in its high speed mode is less efficient than in its low speed mode. In some engine operating conditions, such as light load and low temperatures, it is most efficient to just increase fan steps for additional cooling as engine temperature rises. However, at higher temperatures and loads, and particularly when the next fan step will produce the lower efficiency of a cooling fan in its high speed mode, it may be more efficient to open the link valve and use some of the aftercooler's colder coolant to cool the engine coolant as supplemental cooling between discrete fan steps and thereby delay or eliminate the need for the next fan step. Therefore, an important function of the control is to determine when it is more efficient to use the link valve instead of the next cooling fan step should the engine coolant need additional cooling. Steps 84–89 provide that determination by deriving a reference temperature value ewt ac core in temp ref.

First, the additional accessory power that would be consumed by the next fan step is determined. In step 84, the routine calculates the additional power required for the next fan step. If the next step involves a fan being activated in low speed mode, then the increase in power is:

$$\Delta P_{next\ fan\ step} = K_{low\ speed}\ (ENG\ RPM)^3.$$

If the next fan step involves a fan increasing to it high speed mode, then the increase in power is the difference between that required in the high speed mode and that required in the low speed mode:

$$\Delta P_{next\ fan\ step} = K_{high\ speed}\ (ENG\ RPM)^3 - K_{low\ speed}\ (ENG\ RPM)^3.$$

The brake specific fuel consumption (BSFC) of the engine can be increased by opening the link valve until the aftercooler power loss is equal to the extra fuel that would be consumed if the next cooling fan step were made:

$$\Delta P_{aftercooler\ loss} = \Delta P_{next\ fan\ step}.$$

The change in BSFC can be approximated by a linear function of aftercooler core inlet coolant temperature. This relationship is used in step 85 to convert the change in fan power to an equivalent rise in the aftercooler core inlet coolant temperature:

$$\Delta T_{aftercooler\ rise} = [\Delta P_{next\ fan\ step}]/[(K_{aftercooler})\ (\text{engine power output})]$$

Since the fans of apparatus 32 cool aftercooler radiator 46 as well as engine radiator 24, an increase in the cooling fan step causes the aftercooler core inlet coolant temperature to fall, thus negating part of the negative effect of the extra auxiliary power used. The drop in aftercooler core inlet water temperature that can be expected when the next cooling fan step is activated is based on the current rise of this temperature over the ambient temperature. In step 86, the routine calculates this temperature drop:

$$\Delta T_{fan\ on\ drop} = (AWTAO - AMB\ IMP)\ [1(\text{fans on}+1)].$$

Given the change in temperature that is equal to the extra auxiliary power used when proceeding to the next cooling fan step and the further reduction in temperature that would be caused by this step, a temperature rise equivalent to a cooling fan step is calculated in step 87:

$$\Delta T_{next\ fan\ step\ equivalent} = \Delta T_{aftercooler\ loss} - T_{fan\ on\ drop}.$$

The final steps in the determination of the reference temperature value ewt ac core in temp ref first require the derivation of an estimate of the aftercooler core inlet water temperature if there had been no temperature increase due to the engine coolant control. This reference temperature value is derived in subroutine TEMPERATURE ESTIMATE, which is called in step 88.

Figure 6:
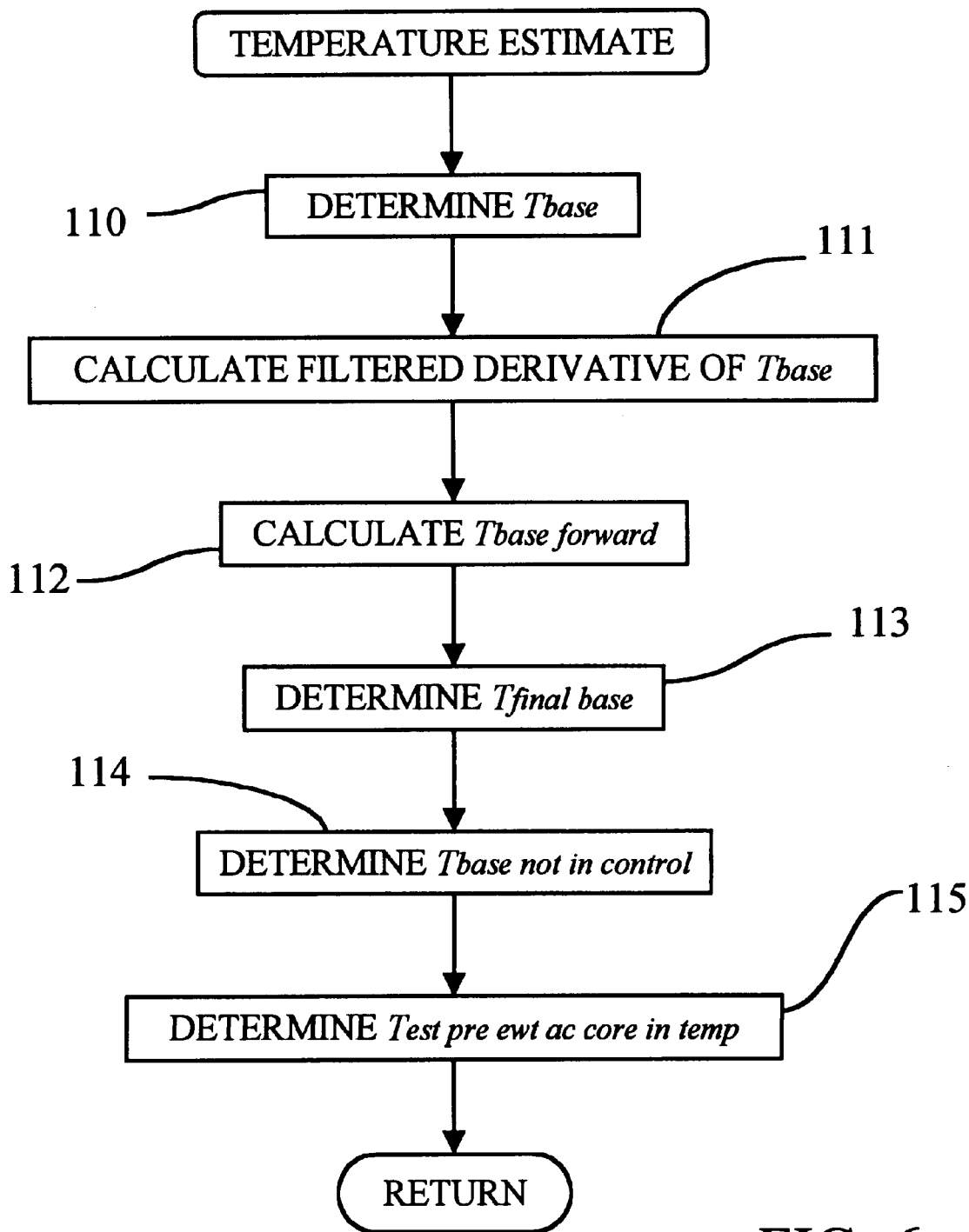

Subroutine TEMPERATURE ESTIMATE is described in the flow chart of FIG. 6. In step 110, this subroutine derives a temperature $T_{base}$:

$$T_{base} = \text{MIN}\ \{\text{MAX}\ \{[\text{pre ewt ac core in temp ref}\ (k-1)], [AWTAO]\}, ETP1\}$$

The maximum attempts to determine what the temperature would be without the effect of the engine cooling control. This is generally the pre ewt ac core in temp ref, which, as will be described at a later point, is the greater of max delta ac core in temp ref and freeze ac core in temp ref. However, this reference may not be obtainable because the link valve is saturated. In this case, AWTAO is used to keep the estimate from being unrealistically low. The minimum part of the function is included for the case wherein the gain of the system is negative because the aftercooler circuit is hotter than the engine water circuit. Allowing the temperature estimate to rise above ETP1 would cause difficulty when the system switches over from negative gain to positive gain, so it is prevented.

The trend of this estimate is also very important since the temperature may be falling. If the final estimate is too high, the system will incorrectly balance the fuel consumption tradeoffs and waste fuel. If the estimated temperature is too low, the engine cooling control's commands will just be ignored. There is a fuel penalty for this error also, but its maximum value is much smaller. To establish a trend, a filtered derivative of the estimate is calculated in step 111:

$$dT_{base}(k+1)/dt = [ADEST][dT_{base}(k)/dt] + [BDEST][T_{base}(k) - T_{base}(k-1)]/[\text{SAMPLING PERIOD}],$$

wherein ADEST and BDEST are predetermined constants and SAMPLING PERIOD equals the time between loop repetitions, 10 seconds in this embodiment.

In step 112, the derivative is then used to forward predict the estimate. The forward predicted base temperature $T_{base\ forward}$ is calculated by multiplying the derivative by a predetermined FORWARD PREDICT TIME and adding it to the base temperature:

$$T_{base\ forward} = T_{base} + [dT_{base}(k+1)/dt][\textit{FORWARD PREDICT TIME}].$$

Since the estimate must be biased low, the minimum $T_{final\ base}$ of the forward predicted temperature and the current temperature is determined in step 113.

$$T_{final\ base} = \text{MIN}\ \{[T_{base}, [T_{base\ forward}]\}$$

As previously stated, the base temperature estimate is latched when ewt ac core in temp ref is controlling the aftercooler core inlet coolant temperature. This condition is referred to as "EWT is in control." EWT is in control when all of the following conditions are met:

(1) The engine cooling control is requesting that cooling be increased as indicated by cooling capacity integrator>0.

(2) Opening the link valve before going to the next cooling step will decrease fuel consumption as indicated by $\Delta T_{next\ fan\ step\ equivalent} > 0$.

(3) The link valve is not completely closed as indicated by final link ratio>0.

(4) The aftercooler core in coolant temperature reference is using ewt ac core in temp ref as its reference as indicated by pre ewt ac core in temp ref<ewt ac core in temp ref.

If EWT is not in control, it is undesirable for the temperature estimate to be too high. This would cause the aftercooler core inlet coolant temperature to remain unnecessarily high. In order to bias the temperature estimate back down, a modified $T_{base}$ equation is used when EWT is not in control. The AWTAO input is biased down so that the aftercooler temperature controller will have an error and cause the temperature to be driven down. The modified equation determines a parameter $T_{base\ not\ in\ control}$ not in control in step 114 as follows:

$$T_{base\ not\ in\ control} = \text{MIN}\ \{\text{MAX}\ \{\text{pre ewt ac core in temp ref}(k-1), (AWTAO - 1^\circ\ \text{C.})\}, ETP1\}.$$

The base temperature estimate $T_{est\ pre\ ewt\ ac\ core\ in\ temp}$ is finally determined in step 115, but the method of determination is different depending on whether or not EWT is in control, as defined above. The conditions for EWT in control are tested and, if EWT is in control, a new value of the base temperature estimate is determined as the minimum of $T_{final\ base}$ and the previous value of the base temperature estimate:

$$T_{est\ pre\ ewt\ ac\ core\ in\ temp}(k+1) = \text{MIN}\ \{T_{final\ base}, T_{est\ pre\ ewt\ ac\ core\ in\ temp}(k)\}.$$

This is essentially a latching function, since the value is changed only by some safeguard parameters designed into the value of $T_{final\ base}$.

If EWT is not in control, a new value of the base temperature estimate $T_{est\ pre\ ewt\ ac\ core\ in\ temp}$ is alternatively determined as follows:

$$T_{pre\ ewt\ ac\ core\ in\ temp}(k+1) = \{T_{final\ base}, T_{base\ not\ in\ control}\}.$$

With the base temperature estimate determined, the routine returns from the subroutine to the main routine.

Figure 5B:
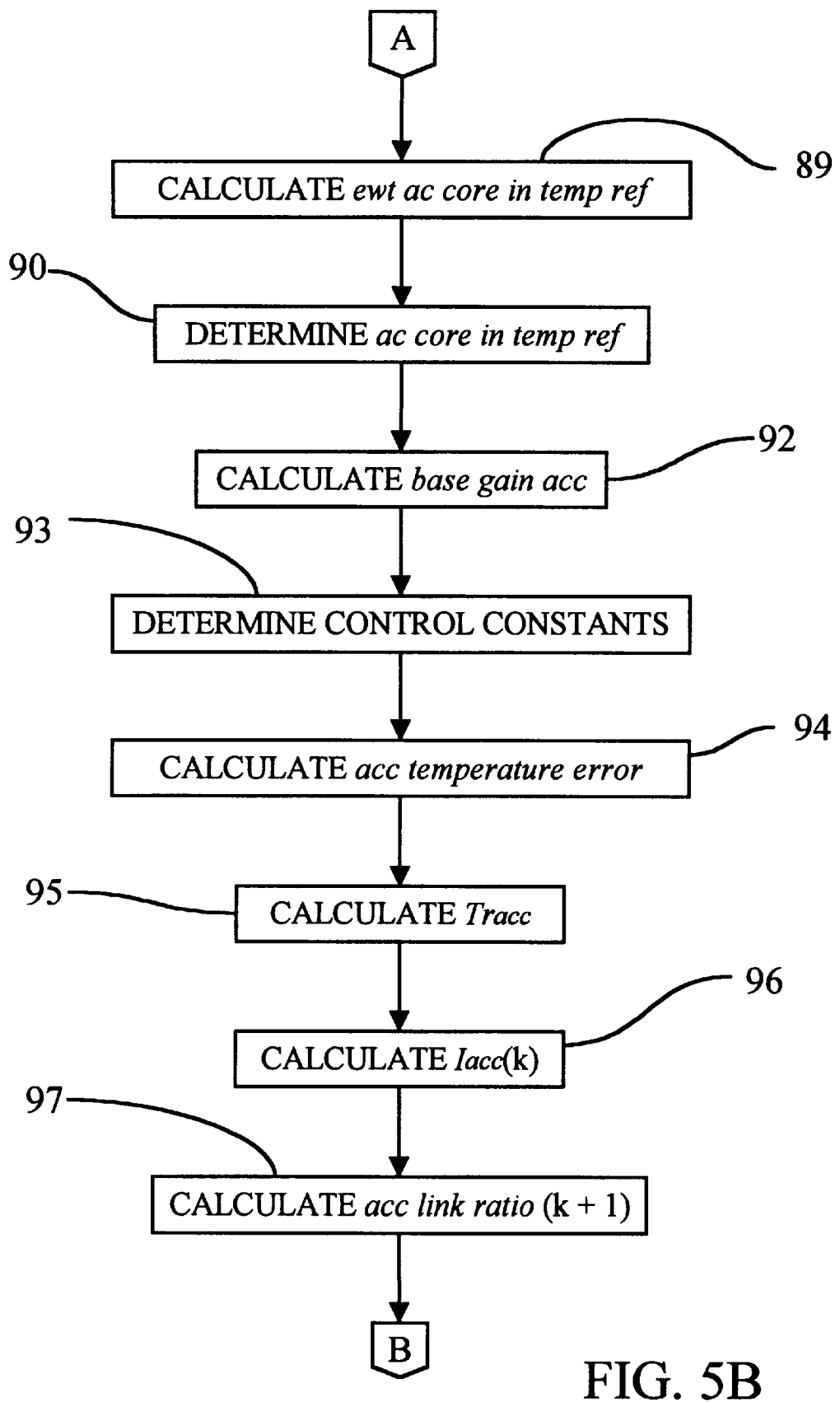

In step 89, shown in FIG. 5B, the reference temperature value ewt ac core in temp ref is finally determined. This determination is performed in one of two alternative ways. If $\Delta T_{next\ fan\ step\ equivalent}$ is greater than zero, then:

ewt ac core in temp ref=MIN {[(cooling capacity integrator) ($\Delta T_{next\ fan\ step\ equivalent}$)+$T_{pre\ ewt\ ac\ core\ in\ temp\ ref}$],[90°]}.

Otherwise, ewt ac core in temp ref=MIN {[$\Delta T_{next\ fan\ step\ equivalent}$+$T_{pre\ ewt\ ac\ core\ in\ temp\ ref}$], [90°]}.

In order to fully understand these determinations and their results, it is necessary to continue this description of the flow chart to step 90, wherein the value of ac core in temp ref is determined from the three reference temperatures derived to this point. In step 90, two of these references are combined:

pre ewt ac core in temp ref=MAX {[max delta ac core in temp ref], freeze ac core in temp ref]}.

The intermediate value pre ewt ac core in temp ref is the higher of the low limits of aftercooler coolant temperature at the aftercooler inlet due to requirements of the cooling apparatus itself: (1) the maximum allowable temperature difference in the coolant loops to prevent thermal stress damage to the radiators and (2) the prevention of coolant (water) freezing. It is determined first because it is needed in the determination of the base temperature estimate described previously.

This intermediate value is then compared with the engine coolant temperature reference to determine the desired coolant temperature at the aftercooler core inlet ac core in temp ref:

ac core in temp ref=MAX {[pre ewt ac core in temp ref], [ewt ac core in temp ref]}.

Thus, except when the aftercooler cooling control provides a higher desired aftercooler coolant temperature to assist the engine cooling control, it will specify a desired aftercooler temperature as low as is consistent with the prevention of physical damage to the radiators and the prevention of coolant freezing.

Now the determination of ewt ac core in temp ref can be more easily understood. Returning to the description of step 89 in FIG. 5B, if $\Delta T_{next\,fan\,step\,equivalent}$ is greater than zero, the temperature rise $\Delta T_{next\,fan\,step\,equivalent}$ is modulated by cooling capacity integrator, the intermediate integrator of the engine cooling control, and added to the base temperature estimate, which is an estimate of the aftercooler core inlet coolant temperature had there been no increase in the temperature by the engine cooling control. Thus, as the value of cooling capacity integrator increases from zero (0), to which it was set at the beginning of the present fan step, toward one (1.0), which will trigger the next fan step, the desired temperature of the coolant at the inlet to the aftercooler will be gradually increased. This will cause a gradual opening of link valve 52 for increased mixing of coolant between the hotter engine coolant loop and the colder aftercooler coolant loop. This, in turn, will produce a gradual increasing in cooling of the engine. When the value of cooling capacity integrator reaches one (1.0), the engine cooling control will cause an advance to the next fan step and reset the value of cooling capacity integrator to zero (0). This value will be output to the aftercooler cooling control to step the value of ewt ac core in temp ref downward to the base temperature estimate; and the link valve will be moved in the closing direction to lower the coolant temperature in the aftercooler coolant loop. The link valve is thus controlled by the aftercooler cooling control, in response to information from the engine cooling control, to fine tune the cooling level in the engine coolant loop between the large jumps in discrete cooling levels produced by the changes in fan steps.

If $\Delta T_{next\,fan\,step\,equivalent}$ is less than zero, however, the alternative determination is used. This can occur with rising engine coolant temperature at low engine speeds and temperatures. As previously described, an increase in air flow from fan apparatus 32 produces a cooling effect in aftercooler radiator 46 as well as engine radiator 24. The effect of this cooling of aftercooler coolant by the fan step increase was taken into account by the parameter $\Delta T_{fan\,on\,drop}$. At low temperatures and fan speeds, this effect is very large compared to the extra power consumed by a fan turning on in its low speed mode. This is reflected in the previously recited equation for the calculation of $\Delta T_{fan\,on\,drop}$:

$\Delta T_{fan\,on\,drop} = (AWTAO - AMB\,TMP)\,[1/(\text{fans on} + 1)]$.

In this expression, the factor [1/(fans on+1)], which is multiplied by the temperature difference, is four times as great (1 versus ¼) for the activation of the first low speed fan (fans on=1), as compared with the first increase of a fan to its high speed mode (fans on=4). In the low speed case, the parameter $\Delta T_{fan\,on\,drop}$ will be sufficiently large as to provide a negative value for $\Delta T_{next\,fan\,step\,equivalent}$. In this case, the alternative equation will be used for ewt ac core in temp ref, which will cause the latter to be less than the base temperature estimate and effectively leave control of aftercooler coolant temperature to the pre ewt ac core in temp ref. The link valve will not open, no additional coolant will be mixed, and the value of cooling capacitor integrator will increase more rapidly to a value of one (1.0) to trigger the first low speed fan activation. Meanwhile, the aftercooler coolant loop is maintained at a low temperature for best fuel economy. At higher fan steps, however, where the use of the link valve is more fuel efficient than the next fan step, the smaller value of $\Delta T_{fan\,on\,drop}$ will produce a positive value for $\Delta T_{next\,fan\,step\,equivalent}$ and the use of the appropriate equation for ewt ac core in temp ref will provide fine tuning by the link valve between fan steps as previously described. Thus, the cooling system control of this invention determines the relative fuel economy penalties associated with an additional fan step and the opening of a link valve across the full range of operating temperatures and engine loads to optimize fuel economy.

The alternative equation for ewt ac core in temp ref provides for similar closing of the link valve when $\Delta T_{next\,fan\,step\,equivalent}$ is negative due to falling engine temperatures. Here the concern is not to optimize efficiency, since this is much more complicated with falling temperatures than with rising temperatures, but simply to pull the valve back to a more closed position, while letting the engine cooling system take care of itself, and be ready for the next temperature increase.

In addition, however, the alternative equation for ewt ac core in temp ref also provides relief for a special condition which would otherwise not be handled correctly. If the engine temperature is falling in low temperature, low speed conditions, it is possible for the values of both cooling capacity integrator and $\Delta T_{next\,fan\,step\,equivalent}$ to be negative. Thus, their product in the equation which includes cooling capacity integrator would produce a positive addition to the base temperature estimate and thus fool the aftercooler cooling control into opening the link valve, when the opposite action is clearly desired. The use of the alternative equation when $\Delta T_{next\,fan\,step\,equivalent}$ is negative prevents this possibility.

It should also be noted that, in each of the alternative equations of step 89, the reference is limited, for example, to 90° C., so that the aftercooler temperature controller command does not become excessive and cause the aftercooler coolant to boil.

Figure 5C:
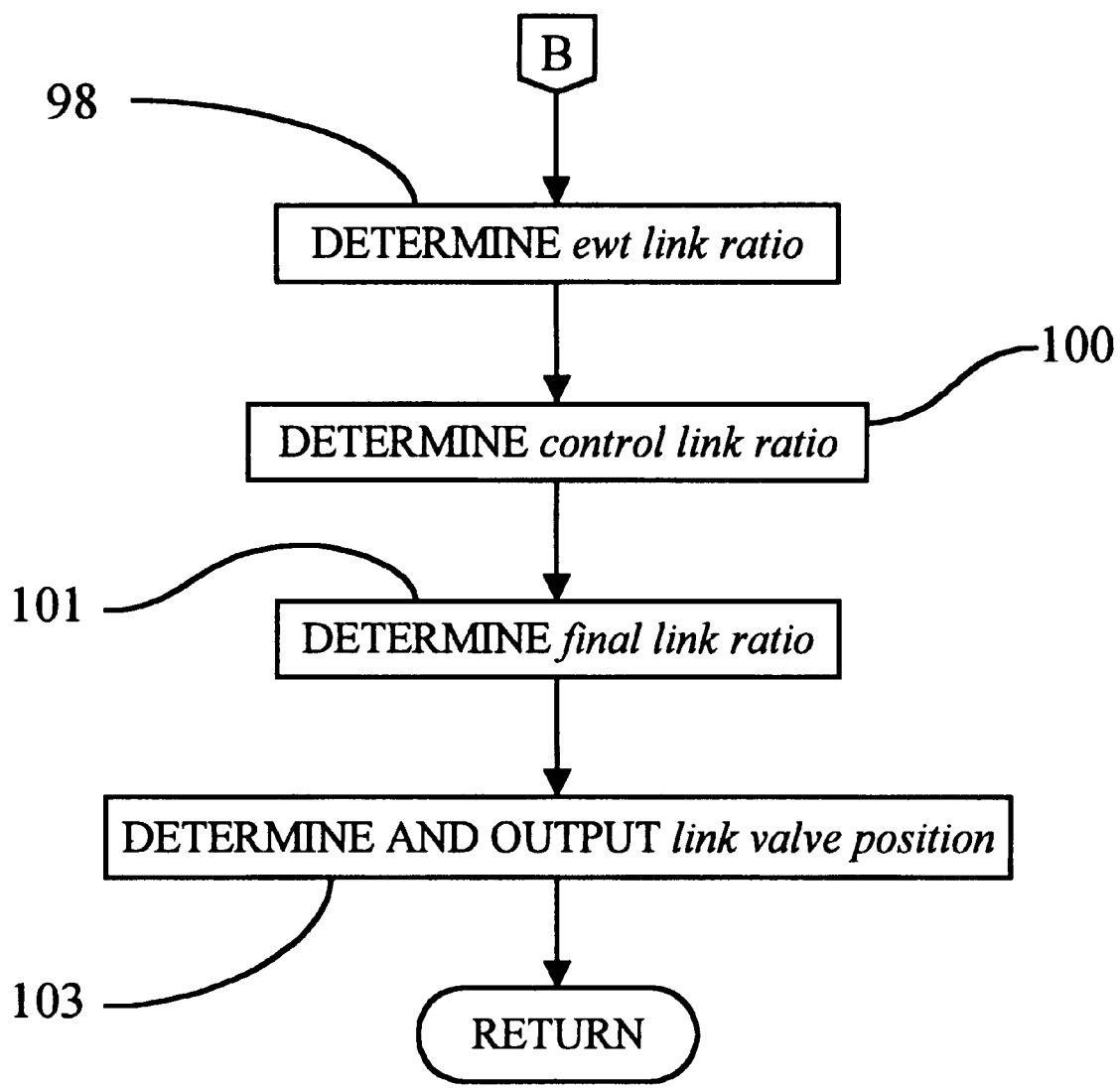

The desired temperature ac core in temp ref having been derived, the remainder of the flow chart of FIGS. 5B and 5C describes the control algorithm itself. At step 92 the base gain acc is calculated. From the system model, $$AWTAO=[AWTRO][1-(\text{ACC LINK RATIO})\,(\text{link ratio})]+[ETP1]$$
$$[\text{ACC LINK RATIO}][\text{link ratio}].$$

Therefore, $$d(AWTAO)/d(\text{link ratio})=(\text{ACC LINK RATIO})\,(ETP1-AWTRO).$$

The inverse system gain is defined as:

$$d(\text{link ratio})/d(AWTAO)=1/[(\text{ACC LINK RATIO})\,(ETP1-AWTRO)].$$

To limit the gain, especially when ETP1=AWTRO, the absolute value of the difference in temperatures is set to at least one (1). If (ETP1−AWTRO)<0, then:

$$\text{delta temperature}=\text{MIN}\,\{[ETP1-AWTRO],-1\}.$$

If (ETP1−AWTRO)>0, then:

$$\text{delta temperature}=\text{MAX}\,\{[ETP1-AWTRO],1\}.$$

In either case, $$\text{base gain acc}=1/[(\text{ACC LINK RATIO})\,(\text{delta temperature})].$$

The primary factor affecting the dynamics of the aftercooler coolant loop is the heat capacity of the aftercooler core and radiator. Other second order effects and non-linearities are minor. The system pole is $P_{acc}$.

The control algorithm can be described as a PI control with integral tracking. The system determines or reads the control constants in step 93. A stored dc gain boost acc has been predetermined from simulations of extreme operating conditions. A constant $A_{acc}=2\pi(P_{acc})$. The sampling time $T_{acc}=10$ seconds. The proportional term gain constant is:

$$K_{acc}=(\text{dc gain boost acc})\,(\text{base gain acc})/A_{acc}.$$

Since the control's link ratio output may not be used, a tracking term is required. The tracking term gain constant is $AT_{acc}=(A_{acc})(T_{acc})$; and the integral term gain constant is $KAT_{acc}=(K_{acc})(AT_{acc})$.

The error term is calculated in step 94:

$$\text{acc temperature error}=\text{ac core in temp ref}-AWTAO.$$

The tracking term is calculated in step 95 as follows:

$$Tr_{acc}=AT_{acc}[\text{final link ratio}-\text{acc link ratio}(k)].$$

The integral term is set to zero if the control was deactivated during the three previous sampling periods. The integral term represents the memory of the control. If the control is not running, the information contained in the integral term becomes useless, since it cannot accumulate tracking and reference error information.

The integral term is calculated in step 96:

$$I_{acc}(k)=I_{acc}(k-1)+Tr_{acc}+(KAT_{acc})\,(\text{acc temperature error}).$$

The control's output combines the proportional and integral terms in step 97:

$$\text{acc link ratio}(k+1)=I_{acc}(k)+(K_{acc})\,(\text{acc temperature error}).$$

To provide opening of the link valve in extreme temperature conditions, when all fans are on full, a variable ewt link ratio is determined in step 98, shown in FIG. 5C. This variable is set equal to cooling capacity integrator when fans on=max fans on; and is otherwise zero.

In step 100, acc link ratio and ewt link ratio are compared and bounded to form control link ratio=MAX {acc link ratio, ewt link ratio}, with the result bounded between 0.0 and 1.0.

The control link ratio determined in step 100 is a value of a desired link ratio; but link valve 52 must meet certain enabling conditions before it will be activated. These enabling conditions for link valve 52 are as follows:

(1) LC Bat signals that the valve actuator signal is powered;
(2) MR Pres signals that the electro-pneumatic actuator has sufficient air pressure to operate;
(3) temperature sensor 54 is operational to provide the signal ETP1;
(4) temperature sensor 56 is operational to provide the signal AWTRO;
(5) temperature sensor 58 is operational to provide the signal AWTAO;
(6) the engine has been running for six consecutive minutes, so that the engine coolant loop is purged of air.

Therefore, in step 101, a final link ratio is determined. Its value equals control link ratio when link valve 52 is enabled but is set to 1.0 when the control is not enabled. This value of 1.0 indicates a fully open link valve and is a default value providing maximum cooling capacity. The engine is started with link valve 52 in this default condition and will remain operating in this mode until all conditions are met, whereupon step 101 will allow activation of link valve 52 toward its closed position.

The operation of the link valve is highly non-linear. Therefore, a look-up table operation, with linear interpolation if required, is provided in step 102 to determine the output signal link valve position from final link ratio; and the value of link valve position is output to link valve 52.

We claim:

1. A cooling system control for an internal combustion engine having coolant passages therethrough, a turbocharger for increasing the density of inlet air thereto, an aftercooler for cooling the inlet air from the turbocharger so as to increase engine power and a cooling system, the cooling system comprising an engine coolant loop having an engine pump, an engine radiator and an engine coolant conduit connecting the engine pump, the coolant passages of the engine and the engine radiator for circulation of liquid coolant, the cooling apparatus further comprising an aftercooler coolant loop comprising an aftercooler pump, an aftercooler radiator and an aftercooler coolant conduit connecting the aftercooler pump, the aftercooler and the aftercooler radiator for circulation of liquid coolant, the cooling apparatus further comprising a linking conduit having a link valve therein connecting the engine and aftercooler coolant loops, the link valve maintaining separate coolant flows in the engine coolant loop and the aftercooler coolant loop while closed and permitting controlled mixing of the coolant flows in the engine coolant loop and the aftercooler coolant loop while open, the cooling apparatus further comprising a fan apparatus powered by the engine and providing variable cooling air flow through the engine and aftercooler radiators in a plurality of selectable, discrete cooling levels, the cooling control comprising:

an engine cooling control responsive to a coolant temperature in the engine coolant loop to operate the fan apparatus at a selected one of the plurality of selectable, discrete cooling levels in response to the temperature of coolant in the engine cooling loop and to derive and output a signal indicative of a desired level of cooling between the selected one and an adjacent one of the plurality of selectable, discrete cooling levels; and an aftercooler cooling control responsive to a coolant temperature in the aftercooler coolant loop and the signal output by the engine cooling control, when the signal indicates a desired increase in engine cooling, to determine whether the desired increase in engine cooling is more efficiently provided by stepping to the next one of the plurality of selectable, discrete cooling levels of the fan apparatus or by opening the link valve and to provide the desired increase in engine cooling by opening the link valve only in the latter case to vary the temperature of coolant in the engine cooling loop, by controlled mixing with coolant of lower temperature in the aftercooler coolant loop, so as to achieve the desired level of cooling indicated by the signal.

2. A cooling system control according to claim 1 in which the aftercooler cooling control, in opening the link valve to provide the desired increase in engine cooling, derives a desired temperature in the aftercooler coolant loop corresponding to the desired level of cooling in the engine coolant loop indicated by the signal and controls the link valve to achieve the desired temperature in the aftercooler coolant loop, whereby the desired level of cooling in the engine coolant loop indicated by the signal is also achieved.

3. A cooling system control according to claim 2 wherein the aftercooler cooling control derives the desired coolant temperature in the aftercooler coolant loop by deriving an aftercooler temperature difference value representing a temperature change in the aftercooler coolant loop equivalent in engine power loss to an activation increase in the fan apparatus to the adjacent one of the plurality of selectable, discrete cooling levels, modulating the aftercooler temperature difference value by the signal to produce a fraction of the aftercooler temperature difference value, and combining the fraction of the aftercooler temperature difference value with a base temperature estimate representing what the desired coolant temperature in the aftercooler coolant loop would be in the absence of the signal.

4. A cooling system control according to claim 3 wherein, if the value of the aftercooler temperature difference value corresponds to a decrease in temperature, the base temperature estimate is used to determine desired coolant temperature in the aftercooler coolant loop without the fraction of the aftercooler temperature difference value.

5. A cooling system control according to claim 1 wherein the aftercooler cooling control derives and compares a first value representing the power cost of stepping to the next one of the plurality of selectable, discrete cooling levels of the fan apparatus and a second value representing the power gain from increased cooling in the aftercooler coolant loop at the next one of the plurality of selectable, discrete cooling levels and provides the desired increase in engine cooling by opening the link valve only when the first value exceeds the second value.

6. A cooling system control according to claim 5 wherein the first value is derived as a rise in temperature in the aftercooler coolant loop producing a change in power equivalent to that produced by stepping to the next one of the plurality of selectable, discrete cooling levels of the fan apparatus and the second value is derived as a decrease in temperature in the aftercooler coolant loop caused by stepping to the next one of the plurality of selectable, discrete cooling levels of the fan apparatus.

* * * * *